United States Patent [19]
Okada et al.

[11] Patent Number: 5,913,397
[45] Date of Patent: Jun. 22, 1999

[54] CLUTCH STRUCTURE WITH PISTON HAVING SURFACE RECESSED FROM PRESSURE SURFACE FOR REDUCING STRESS CONCENTRATION

[75] Inventors: Takashi Okada; Fumihito Konagaya, both of Shizuoka, Japan

[73] Assignee: Jatco Corporation, Fuji, Japan

[21] Appl. No.: 08/921,706

[22] Filed: Sep. 2, 1997

[30] Foreign Application Priority Data

Sep. 5, 1996 [JP] Japan .................................. 8-235595

[51] Int. Cl.⁶ .............................................. F16D 25/0638
[52] U.S. Cl. .................................. 192/85 AA; 192/70.19; 192/87.15
[58] Field of Search .......................... 192/85 AA, 109 R, 192/70.2, 70.19, 87.15, 87.16, 106 F

[56] References Cited

U.S. PATENT DOCUMENTS

| | | | |
|---|---|---|---|
| 3,038,575 | 6/1962 | Hansen | 192/85 |
| 3,730,022 | 5/1973 | O'Malley | 74/759 |
| 3,776,066 | 12/1973 | Piret | 74/763 |
| 4,226,319 | 10/1980 | Euler et al. | 192/85 |
| 4,400,998 | 8/1983 | Bookout et al. | 74/740 |
| 4,440,282 | 4/1984 | Ishimaru et al. | 192/70.2 |
| 4,732,253 | 3/1988 | Hiramatsu et al. | 192/87.11 |
| 4,753,132 | 6/1988 | Sumiya et al. | 74/753 |
| 4,811,628 | 3/1989 | Winkam et al. | 74/10.5 |
| 4,836,052 | 6/1989 | Iwanaga et al. | 74/759 |
| 4,994,006 | 2/1991 | Kinoshita et al. | 475/286 |
| 5,029,685 | 7/1991 | Takase et al. | 192/48.91 |
| 5,232,411 | 8/1993 | Hayashi et al. | 475/146 |
| 5,630,492 | 5/1997 | Yoshikawa | 192/85 AA X |

FOREIGN PATENT DOCUMENTS 62-288753  12/1987  Japan .

Primary Examiner—Charles A. Marmor
Assistant Examiner—Ankur Parekh
Attorney, Agent, or Firm—Foley & Lardner

[57] ABSTRACT

A clutch structure for a vehicular power train, includes a clutch disc and a piston moveable along an axis to force the clutch disc. The piston includes a generally cylindrical portion having projections extending axially in circumferentially spaced and parallel relation. The piston has a pressure surface engageable with the clutch disc upon the piston forcing the clutch disc. The piston also has a portion defined by a surface recessed from the pressure surface. The portion is disposed in a radial inner periphery of the cylindrical portion and extends along the axis. A groove is disposed within that portion.

13 Claims, 6 Drawing Sheets

FIG.6

| FRICTION ELEMENTS / SPEED RATIO | 2-4/B | H/C | F/C | FO/C | OR/C | LO/C | LR/B | R/C |
|---|---|---|---|---|---|---|---|---|
| REVERSE | | | | | | | ○ | ○ |
| FORWARD 1 | | | | | | ○ | △ | |
| FORWARD 2 | ○ | | ○ | ○ | △ | | | |
| FORWARD 3 | ○ | ○ | ○ | ○ | △ | | | |
| FORWARD 4 | ○ | ○ | ○ | | △ | | | |

…

CLUTCH STRUCTURE WITH PISTON HAVING SURFACE RECESSED FROM PRESSURE SURFACE FOR REDUCING STRESS CONCENTRATION

BACKGROUND OF THE INVENTION

Field of the Invention

The present invention relates to a clutch structure for a vehicular power train.

Japanese Patent Application First Publication No. 62-288753 discloses a vehicular power train, including two multiple disc clutches within a clutch drum. One of the multiple disc clutches includes a set of multiple discs and a generally cylindrical piston forcing the set of multiple discs to be engaged with each other. The piston has projections and slots arranged circumferentially alternately. The other of the multiple disc clutches includes a set of multiple discs and a back-up plate for retaining the set of multiple discs. The multiple discs and the back-up plate have on radial outer peripheries thereof teeth engaged with the projections and slots of the piston of the one multiple disc clutch. The piston also has, on radial inner peripheries of the projections, grooves provided for mounting a snap ring for retaining the back-up plate.

It is an object of the present invention to provide a clutch structure for a vehicular power train that is capable of preventing a stress, caused when the piston forces an opposed disc, from concentrating on a portion of a piston that surrounds the groove for mounting a snap ring. This serves to improve retention of the snap ring at the groove and enhances the performance of the clutch.

SUMMARY OF THE INVENTION

According to one aspect of the present invention, there is provided a clutch structure for a vehicular power train, comprising:

a clutch disc;

a piston moveable along an axis to force the clutch disc, the piston including a generally cylindrical portion formed with projections axially extending in circumferentially spaced and parallel relation;

a pressure surface engageable with the clutch disc, the pressure surface being disposed on the piston;

a portion defined by a surface recessed from the pressure surface, the portion being disposed in a radial inner periphery of the generally cylindrical portion of the piston and free from reaction due to engagement of the pressure surface with the clutch disc, the recessed portion along the axis of the piston; and a groove disposed within the portion.

BRIEF DESCRIPTION OF THE DRAWINGS

FIG. 6 is the table showing a relationship between speed ratios and friction elements of the power train of FIG. 5.

DESCRIPTION OF THE PREFERRED EMBODIMENT

Figure 3:
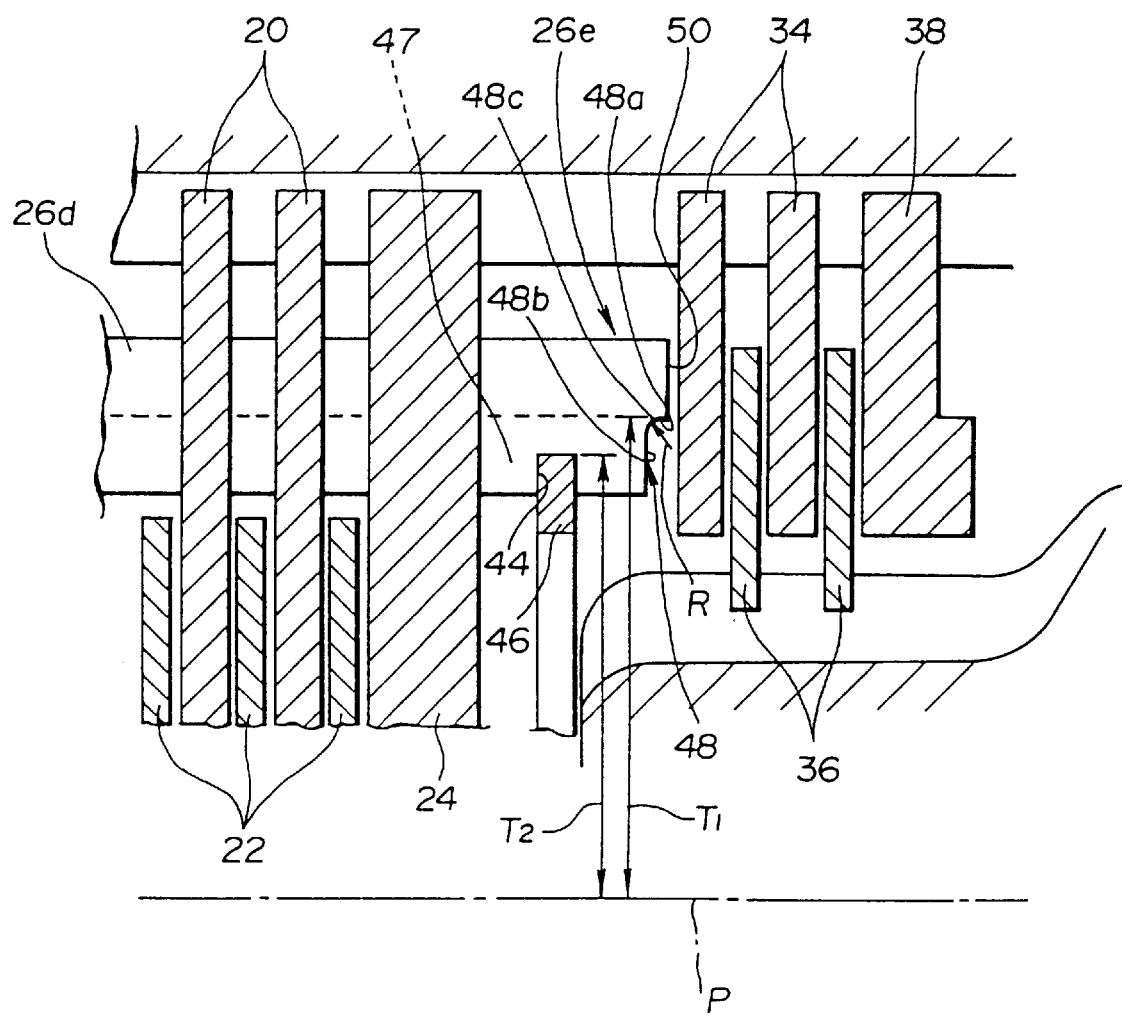
FIG. 3 is an enlarged section of the clutch structure of FIG. 1.
Figure 4:
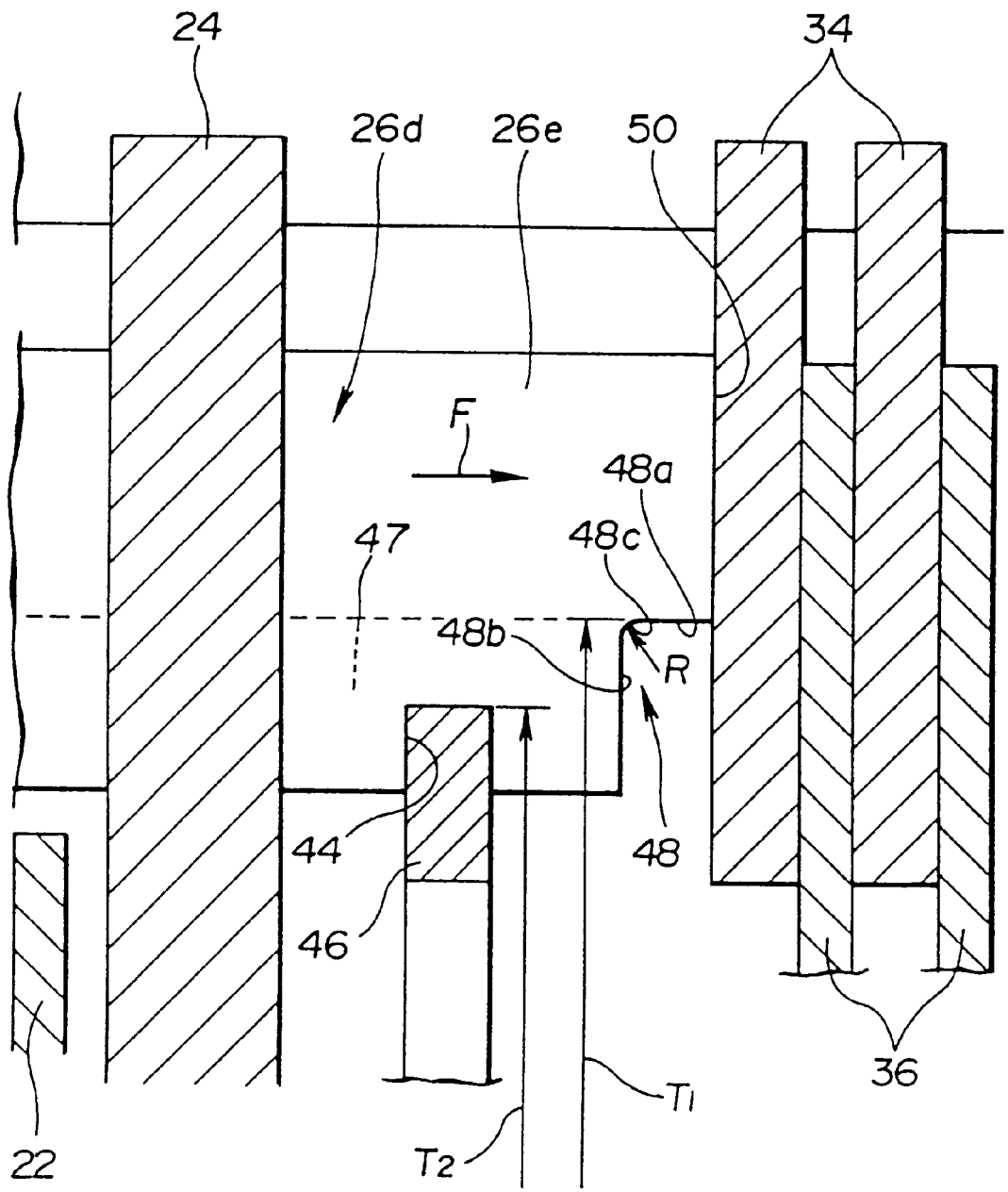
FIG. 4 is an enlarged section of the clutch structure of FIG. 1, showing multiple discs urged by the piston into engagement with each other.
Figure 5:
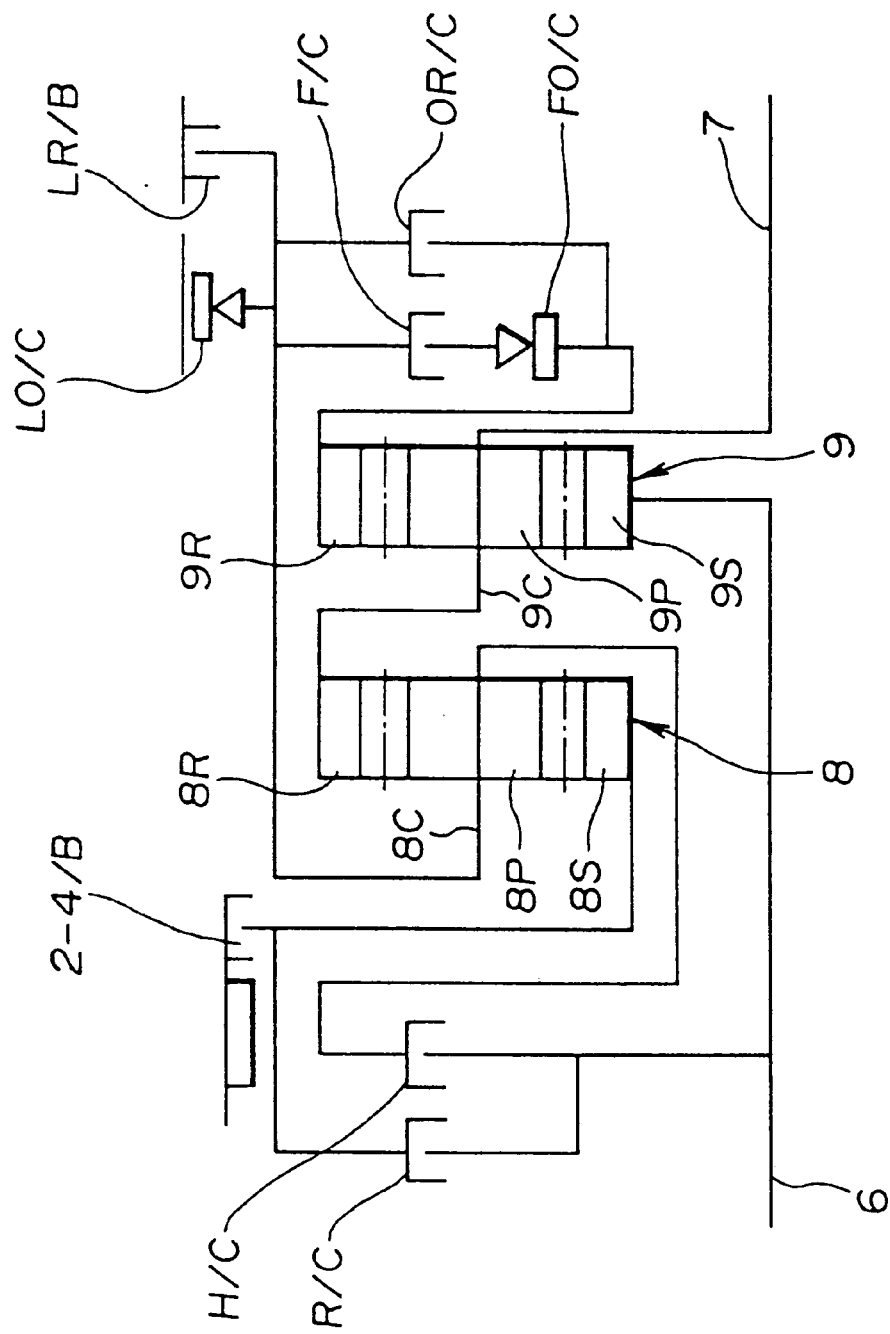
FIG. 5 is a simplified schematic view of a vehicular power train to which the clutch structure according to the present invention can be incorporated.

FIGS. 1–4 illustrate a preferred embodiment of a clutch structure according to the present invention, and FIG. 5 illustrates a power train of an automatic transmission of a vehicle which includes the clutch structure shown in FIGS. 1–4.

As illustrated in FIG. 5, the automatic transmission includes an input shaft 6, an output shaft 7 coaxial with the input shaft 6, and a first planetary gear set 8, and a second planetary gear set 9, which gear sets are coaxial with the input shaft 6 and the output shaft 7. The first planetary gear set 8 includes a first sun gear 8S, a first ring gear 8R, a plurality of first planet pinions 8P meshing with both the sun gear 8S and the ring gear 8R. The first planet pinions 8P are rotatably supported by a first carrier 8C. Similarly, the second planetary gear set 9 includes a second sun gear 9S, a second ring gear 9R, a second carrier 9C, and a plurality of second planet pinions 9P engaged with the sun gear 9S and the ring gear 9R and rotatably supported by the carrier 9C.

The automatic transmission also includes friction elements composed of a reverse clutch R/C, a high clutch H/C, a 2-4 brake 2-4/B, a forward clutch F/C, an overrun clutch OR/C, a low one-way clutch LO/C, a low & reverse brake LR/B, and a forward one-way clutch FO/C.

The high clutch H/C is operative to selectively connect the carrier 8C of the first planetary gear set 8 with the input shaft 6. The 2-4 brake 2-4/B is operative to selectively brake the sun gear 8S of the first planetary gear set 8. The reverse clutch R/C is operative to selectively connect the sun gear 8S with the input shaft 6. The low & reverse brake LR/B is operative to selectively brake the carrier 8C. The low one-way clutch LO/C is operative to prevent reverse rotation of the carrier 8C relative to engine rotation.

The carrier 9C of the second planetary gear set 9 is drivingly connected with the output shaft 7. The sun gear 9S of the second planetary gear set 9 is connected with the input shaft 6. The overrun clutch OR/C is operative to selectively connect the ring gear 9R of the second planetary gear set 9 with the carrier 8C of the first planetary gear set 8. The forward one-way clutch FO/C and the forward clutch F/C are operative to selectively connect the ring gear 9R with the carrier 8C. The forward one-way clutch FO/C is also operative to connect the ring gear 9R with the carrier 9C in response to reverse rotation of the ring gear 9R being caused by connection with the forward clutch F/C.

The reverse clutch R/C, the high clutch H/C, the 2-4 brake 2-4/B, the forward clutch F/C, the overrun clutch OR/C, and the low & reverse brake LR/B are actuatable by hydraulic pressure to establish the connecting and braking operation as described above.

The first and second planetary gear sets 8 and 9 are selectively controlled by cooperation of the friction elements, i.e., clutches H/C, F/C, OR/C, R/C, FO/C and LO/C and brakes 2-4/B and LR/B, to change rotation speed of the output shaft 7 relative to rotation speed of the input shaft 6, providing four forward speed ratios and one rearward speed ratio as shown in a table of FIG. 6. In the table, symbol ◯ indicates an actuated state, i.e., hydraulic pressure-applied state, and symbol Δ indicates a condition to be actuated when engine brake is required. If the overrun clutch OR/C is conditioned to be actuated, the forward one-way clutch FO/C parallel to the overrun clutch OR/C comes into an unactuated state. If the low & reverse brake LR/B is conditioned to be actuated, the low one-way clutch LO/C comes into an unactuated state.

Referring back to FIGS. 1–4, there is shown a part of the power train that includes a clutch structure of the present invention.

Figure 1:
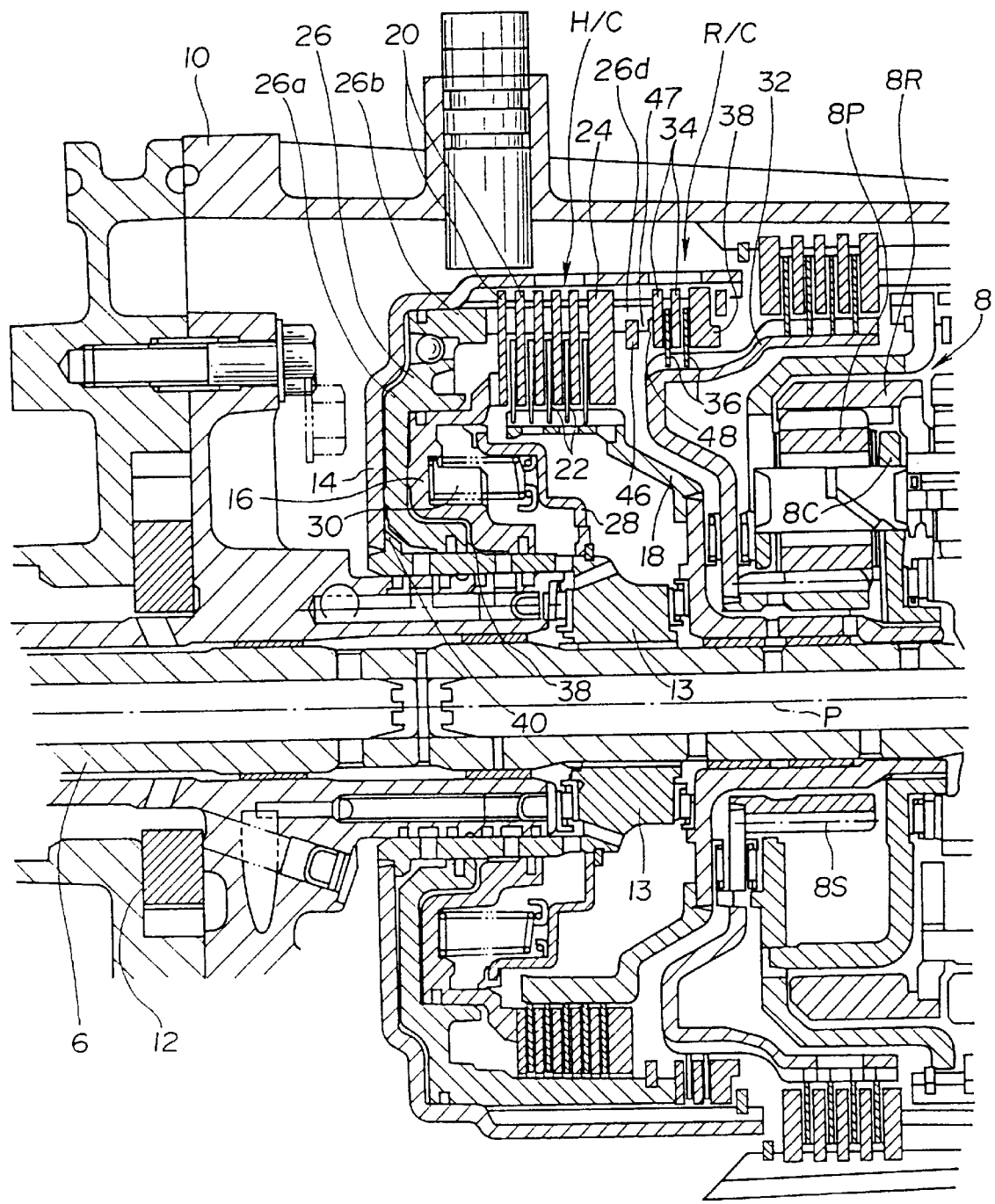
FIG. 1 is an axial longitudinal cross-section of a vehicular power train, showing a clutch structure according to the present invention.

As illustrated in FIG. 1, the input shaft 6 is enclosed in a transmission housing 10. The input shaft 6 is connected with a torque converter, not shown, to be arranged leftward in FIG. 1. The input shaft 6 is rotatable about an axis P by a torque transmitted from the torque converter. An oil pump 12 for discharging working fluid is arranged coaxially with the input shaft 6 as shown on the left side of FIG. 1. As illustrated on the right side of FIG. 1, the first planetary gear set 8 is disposed in coaxially with the input shaft 6. The high clutch H/C and the reverse clutch R/C are disposed between the oil pump 12 and the first planetary gear set 8.

Figure 2:
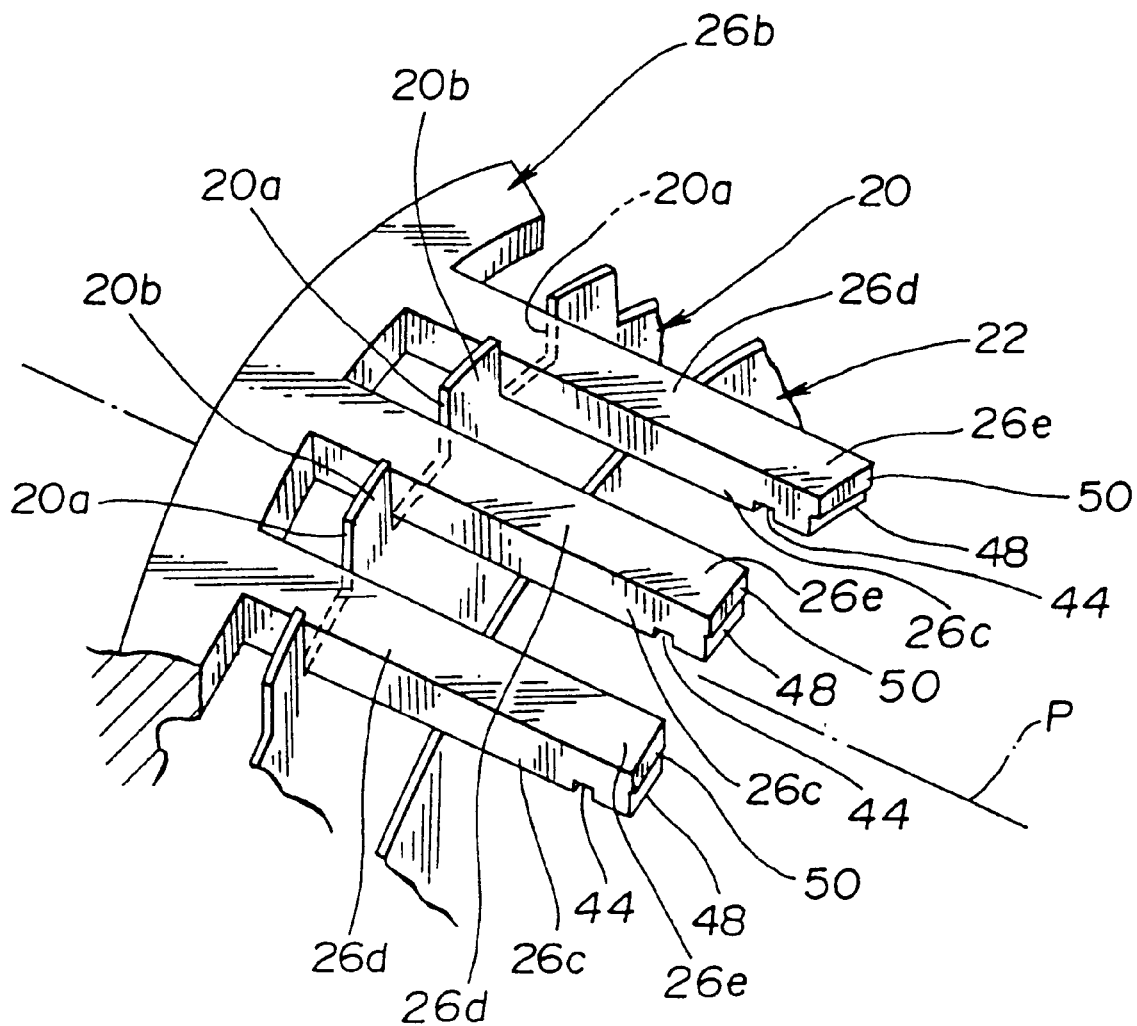
FIG. 2 is a fragmentary enlarged perspective view of the clutch structure of FIG. 1, showing a piston and a disc engaged with the piston.

The high clutch H/C disposed on the oil pump side is in the form of a multiple disc clutch. The high clutch H/C includes a clutch drum 14 secured to a generally cylindrical sleeve 13 coaxially coupled and splined to the input shaft 6. The clutch drum 14 is rotatable together with the input shaft 6. A high clutch piston 16 is disposed within the clutch drum 14 so as to be slidable along the axis P. A high clutch hub 18 is splined to the carrier 8C of the first planetary gear set 8 and carries a set of multiple drive discs 22. The drive discs 22 are disposed within the clutch drum 14 in engagement at their inner circumferential portions with an outer periphery of the high clutch hub 18. A set of multiple driven discs 20 are also disposed within the clutch drum 14 and engaged at their outer circumferential portions with an inner periphery of the clutch drum 14. As best shown in FIG. 2, each of the driven discs 20 has at the outer circumferential portion circumferentially spaced recesses 20a that form projections 20b alternatively arranged to form a series of teeth. The driven discs 20 and the drive discs 22 are alternately arranged and slidably moveable along the axis P. A back-up plate 24 is disposed adjacent to the driven discs 20 and the drive discs 22 to retain these discs 20 and 22. The back-up plate 24 is engaged at its outer circumferential portion with the inner periphery of the clutch drum 14. The high clutch piston 16 is biased toward a reverse clutch piston 26 disposed between the clutch drum 14 and the high clutch piston 16, by a return spring 30 retained by a spring bearing 28 mounted to the sleeve 13. The high clutch piston 16 is moveable against the biasing force of the return spring 30, in response to increase in fluid pressure within a high clutch fluid pressure chamber 38 disposed between the high clutch piston 16 and the reverse clutch piston 26.

The reverse clutch R/C disposed on the first planetary gear set side is in the form of a multiple disc clutch. The reverse clutch R/C includes the reverse clutch piston 26 as explained more concretely later, and a reverse clutch hub 32 coaxially coupled with the sun gear 8S of the first planetary gear set 8. The reverse clutch hub 32 carries a second set of multiple drive discs 36. The drive discs 36 are disposed within the clutch drum 14 and engaged at their inner circumferential portions with an outer periphery of the reverse clutch hub 32. The reverse clutch R/C also includes a second set of multiple driven discs 34 disposed within the clutch drum 14 in engagement at their outer circumferential portions with the inner periphery of the clutch drum 14. These drive discs 34 and driven discs 36 are axially spaced apart from the drive discs 20 and driven discs 22 of the high clutch H/C. The driven discs 34 and the drive discs 36 are alternately arranged and slidably moveable along the axis P. A back-up plate 38 adjacent to the driven discs 34 and the drive discs 36 retains these discs 34 and 36. The back-up plate 38 is engaged at its outer circumferential portion with the inner periphery of the clutch drum 14.

The reverse clutch piston 26 is slidably disposed on an outer periphery of the sleeve 13. The reverse clutch piston 26 is moveable along the axis P toward the high clutch piston 16 in response to increase in fluid pressure within a reverse clutch fluid pressure chamber 40 disposed between the clutch drum 14 and the reverse clutch piston 26. Specifically, the reverse clutch fluid pressure chamber 40 is defined by an inside surface of the clutch drum 14 and an outer surface of a generally disc portion 26a of the reverse clutch piston 26. The reverse clutch piston 26 has a generally cylindrical portion 26b extending from an outer circumference of the disc portion 26a along the axis P.

As best shown in FIG. 2, the reverse clutch piston 26 has at the cylindrical portion 26b a plurality of slots 26c and a plurality of finger-like projections 26d which are arranged circumferentially alternately. The slots 26c are spaced apart from each other in circumferentially equidistant relation. The slots 26c extend from an axial distal end of the cylindrical portion 26b in parallel with each other along the axis P and terminate before a corner portion at which the cylindrical portion 26b is connected with the disc portion 26a. The spaced apart slots 26c form projections 26d interposed between the adjacent two slots 26c and thus circumferentially equidistantly spaced apart from each other. The projections 26d extend parallel with each other along the axis P through the recesses 20a of each of the driven plates 20 of the high clutch H/C. The projections 26d are engaged with the teeth of each driven plate 20.

The reverse clutch piston 26 has grooves 44 on distal end portions 26e of the projections 26d. The grooves 44 have a generally rectangular section as shown in FIG. 3 and extend radially outward from radial inner peripheries of the projections 26d. The grooves 44 are in axial alignment with each other to form a circumferential groove in an inner circumferential surface of the cylindrical portion 26b of the piston 26. Each of the grooves 44 is axially distant from the back-up plate 24 of the high clutch H/C, as shown in FIGS. 1 and 3.

As best shown in FIG. 3, a snap ring 46 is mounted to the groove 44 and retains the back-up plate 24 by limiting its movement along the axis P upon actuation of the high clutch piston 16.

The reverse clutch piston 26 has, on the distal end portions 26e of the projections 26d, pressure surfaces 50 engageable with the driven disc 34 of the reverse clutch R/C. The pressure surfaces 50 are located at an axial terminal end of the cylindrical portion 26b in alignment with each other. Each of the pressure surfaces 50 extends radially inward from a radial outer periphery of each of the projections 26d which surface is a part of an outer circumferential surface of the cylindrical portion 26b. The pressure surface 50 is opposed to a pressure receiving surface extending radially, of which is the driven disc 34 which is closest to the distal end portion 26e of the projection 26d. Upon actuation of the reverse clutch piston 26, the pressure surfaces 50 engage the pressure receiving surface of the driven disc 34 and urge the opposed driven disc 34 toward the adjacent drive disc 36 to cause engagement between the driven discs 34 and the drive discs 36.

The reverse clutch piston 26 also has a portion 47 as indicated by a phantom line in FIG. 3, in a radial inner periphery of the cylindrical portion 26b. Specifically, the portion 47 is disposed in the radial inner periphery of each projection 26d of the cylindrical portion 26b. The portion 47 is defined by a surface 48 recessed from the pressure surfaces 50. The portion 47 is free from a reaction force due to the pressure surfaces 50 engaging the pressure receiving surface of the driven disc 34. The portion 47 is disposed on the radial inner side of the projection 26d. The portion 47 extends along the axis P toward the disc portion 26a of the piston 26 and radially outward from the radial inner periphery of the projection 26d. The groove 44 is disposed within the portion 47. The portion 47 extends farther from the radial inner periphery of the projection 26d in a direction perpendicular to the axis P than the groove 44 does. Specifically, as shown in FIG. 3, the portion 47 has a bottom spaced apart from the axis P by a radial distance T1 and the groove 44 has a bottom remote from the axis P by a radial distance T2, which is smaller than the radial distance T1. Namely, the portion 47 has a maximum radial length greater than a radial length of the groove 44. The recessed surface 48 of the portion 47 includes an axially extending surface portion 48a extending along the axis P, a perpendicular surface portion 48b extending from the radial inner periphery of the projection 26 in the direction perpendicular to the axis P, and a round corner surface portion 48c interconnecting the surface portions 48a and 48b. The axially extending surface portion 48a is at the bottom of the portion 47 and connected with the pressure surface 50. The round corner surface portion 48c has a predetermined radius of curvature as indicated at R in FIGS. 3 and 4. Upon actuation of the reverse clutch piston 26, the recessed surface 48 is out of contact with the pressure receiving surface of the driven disk 34 while the pressure surface 50 is engaged with the pressure receiving surface. The portion 47 is prevented from the influence of the reaction force produced when the pressure surface 50 is urged against the pressure receiving surface. Therefore, the groove 44 within the portion 47 is prevented from being subject to concentration of a stress caused by the reaction force, on corners thereof. The recessed surface 48 is integrally formed with the reverse clutch piston 26 by using a mold.

For purposes of achieving forward third speed ratio and forward fourth speed ratio, working fluid is supplied to the high clutch fluid pressure chamber 38 to increase fluid pressure within the chamber 38. The high clutch piston 16 is moved rightward as viewed in FIG. 3, along the axis P against the biasing force of the return spring 30, and forces the opposed driven disc 20 of the high clutch H/C to be engaged with the adjacent drive disc 22 thereof. Then, as illustrated in FIG. 4, the driven discs 20 and the drive discs 22 of the high clutch H/C are conditioned to be engaged with each other. This engagement between the driven discs 20 and the drive discs 22 allows a positive torque of the input shaft 6 to be transmitted to the carrier 8C of the first planetary gear set 8 via the clutch drum 14, the driven discs 20, the drive discs 22, and the high clutch hub 18. In the case of the forward fourth speed ratio, the sun gear 8S is braked by the 2-4 brake 2-4/B so that the positive torque transmitted to the carrier 8C is further transmitted to the output shaft 7 via the ring gear 8R and the carrier 9C of the second planetary gear set 9.

On the other hand, for achieving the rearward speed ratio, working fluid is supplied to the reverse clutch fluid pressure chamber 40. Fluid pressure within the chamber 40 increases so that the reverse clutch piston 26 is moved rightward as viewed in FIG. 3, along the axis P against the biasing force of the return spring 30. The distal end portions 26e of the projections 26d of the reverse clutch piston 26 urge the opposed driven disc 34 of the reverse clutch R/C to be engaged with the adjacent drive disc 36 of the reverse clutch R/C. To this end, the driven discs 34 and the drive discs 36 of the reverse clutch R/C are brought into engagement with each other. This engagement between the driven discs 34 and the drive discs 36 allows a positive torque of the input shaft 6 to be transmitted to the sun gear 8S of the first planetary gear set 8 via the clutch drum 14, the driven discs 34, the drive discs 36, and the reverse clutch hub 32. Then, the low & reverse brake LR/B brakes the carrier 8C so that the positive torque transmitted to the sun gear 8S is converted to a negative torque, which is transmitted via the ring gear 8C to the output shaft 7.

In such operation of the reverse clutch R/C, when the reverse clutch piston 26 forces the driven disc 34 as indicated by arrow F in FIG. 4, the recessed surface 48 of the portion 47 of each projection 26d of the piston 26 is out of contact with the pressure receiving surface of the driven disc 34 while the pressure surface 50 of the projection 26d of the piston 26 is engaged with the pressure receiving surface. The reaction force, produced by the engagement of the pressure surface 50 with the pressure receiving surface of the driven disc 34, is prevented from influencing the portion 47. Therefore, a stress caused by the reaction force is prevented from being concentrated on the corner of the groove 44 disposed within the portion 47. The groove 44 can assuredly retain the snap ring 46 therein, so that the snap ring 46 retains the back-up plate 24 of the high clutch H/C by limiting its movement along the axis P. Further, the provision of the round corner surface portion 48c of the recessed surface 48 of the portion 47 serves to reduce concentration of the stress on the corner of the recessed surface 48 upon the engagement of the pressure surface 50 with the driven disc 34. This contributes to increase in durability of the reverse clutch piston 26 when being exposed to repeating operations of urging the driven disc 34.

As be appreciated from the above description, the clutch structure of the present invention can enhance a performance of the clutch of the vehicular power train.

The clutch structure according to the present invention is not limited to the reverse clutch R/C and the high clutch H/C as described in the above-embodiment but can be used for other clutches of the power train of the vehicle.

What is claimed is:

1. A clutch structure for a vehicular power train, comprising:
    a clutch disc;
    a piston movable along an axis to force the clutch disc, said piston including a generally cylindrical portion formed with projections extending axially in circumferentially spaced and parallel relation;
    a pressure surface engageable with the clutch disc, said pressure surface being disposed on the piston;
    a portion defined by a surface recessed from the pressure surface, said portion being disposed in a radial inner periphery of the generally cylindrical portion of the piston and free from reaction due to engagement of the pressure surface with the clutch disc, said portion extending along the axis of the piston; and
    a groove disposed within said portion;
    wherein said portion extends farther from the radial inner periphery of the generally cylindrical portion of the piston in a direction perpendicular to the axis than the groove does.

2. A clutch structure as claimed in claim 1, wherein said surface includes an axially extending surface portion extending along the axis and connected with the pressure surface, a perpendicular surface portion extending outward from the inner periphery of the piston in the direction perpendicular to the axis, and a round corner surface portion interconnecting the axially extending surface portion and the perpendicular surface portion.

3. A clutch structure as claimed in claim 1, further comprising a snap ring mounted to the groove.

4. A clutch structure as claimed in claim 3, further comprising a second clutch disc axially spaced apart from the snap ring and a back-up plate disposed between the snap ring and the second clutch disc and adjacent the second clutch disc.

5. A claim structure as claimed in claim 4, wherein said second clutch disc and said back-up plate each have outer circumferential teeth engaged with the projections of the piston.

6. A clutch structure as claimed in claim 4, wherein said second clutch disc is in the form of a set of multiple discs.

7. A clutch structure as claimed in claim 1, wherein said clutch disc is in the form of a set of multiple discs.

8. A clutch structure for a vehicular power train, comprising:

a clutch disc;

a piston for moving the clutch disc, the piston having:

a generally cylindrical portion with circumferentially spaced parallel projections each terminating to a free end;

a pressure surface at each free end of the projections and engageable with the clutch disc;

a recessed surface formed adjacent to and extending radially inwardly from the pressure surface;

a reaction free portion that is free from reaction to engagement of the pressure surface with the clutch disc, the reaction free portion being defined between an inner periphery of each projection and a phantom line extending axially from where the recessed surface and the pressure surface meet; and a groove formed in each reaction free portion for receiving a snap ring, wherein the reaction free portion is thicker than the depth of the groove.

9. A clutch structure as claimed in claim 8, further including a snap ring seated in the grooves formed in the projections.

10. A clutch structure as claimed in claim 9, further including a second clutch disc spaced apart axially from the snap ring, and a back-up plate disposed between the snap ring and the second clutch disc.

11. A clutch structure as claimed in claim 10, wherein the second clutch disc and the back-up plate each have outer circumferential teeth to receive the projections.

12. A clutch structure as claimed in claim 10, wherein the second clutch disc comprises a set of multiple discs.

13. A clutch structure as claimed in claim 8, wherein the clutch disc comprises a set of multiple discs.

* * * * *